(12) United States Patent
Jalali

(10) Patent No.: US 9,806,794 B2
(45) Date of Patent: Oct. 31, 2017

(54) ANTENNA SYSTEM FOR A BROADBAND ACCESS TO AIRBORNE PLATFORMS

(71) Applicant: Ahmad Jalali, Rancho Santa Fe, CA (US)

(72) Inventor: Ahmad Jalali, Rancho Santa Fe, CA (US)

(73) Assignee: UBIQOMM, INC.

( * ) Notice: Subject to any disclaimer, the term of this patent is extended or adjusted under 35 U.S.C. 154(b) by 561 days.

(21) Appl. No.: 14/337,149

(22) Filed: Jul. 21, 2014

(65) Prior Publication Data
US 2015/0280806 A1    Oct. 1, 2015

Related U.S. Application Data

(63) Continuation of application No. 14/228,640, filed on Mar. 28, 2014, now Pat. No. 9,385,803.

(51) Int. Cl.
| | |
|---|---|
| *H04B 7/185* | (2006.01) |
| *H04W 40/22* | (2009.01) |
| *H04W 84/06* | (2009.01) |
| *H04W 28/02* | (2009.01) |
| *H04B 7/10* | (2017.01) |
| *H04W 36/08* | (2009.01) |

(52) U.S. Cl.
CPC ........ *H04B 7/18506* (2013.01); *H04W 40/22* (2013.01); *H04B 7/10* (2013.01); *H04W 28/0226* (2013.01); *H04W 28/0231* (2013.01); *H04W 36/08* (2013.01); *H04W 84/06* (2013.01)

(58) Field of Classification Search
CPC ............................. H04W 40/22; H04B 7/155
See application file for complete search history.

(56) References Cited

U.S. PATENT DOCUMENTS

| | | | | |
|---|---|---|---|---|
| 2002/0034943 | A1* | 3/2002 | Pallonen | H01Q 3/24 455/424 |
| 2007/0015544 | A1* | 1/2007 | Garrett | H04W 88/08 455/562.1 |
| 2008/0102812 | A1* | 5/2008 | Chari | H01Q 1/283 455/424 |

* cited by examiner

*Primary Examiner* — Derrick Ferris
*Assistant Examiner* — Farhad Ali
(74) *Attorney, Agent, or Firm* — Thomas D. Foster; Bruce Hare

(57) ABSTRACT

A system for broadband access to airborne platforms is described. The system includes: a ground station with a number of antenna panels, each antenna panel having two polarizations; the ground station having multiple modems connected to the different antenna panels and a processor controlling the modems; and the aircraft equipment comprising of a modem attached to an antenna with two polarizations.

16 Claims, 12 Drawing Sheets

ANTENNA SYSTEM FOR A BROADBAND ACCESS TO AIRBORNE PLATFORMS

CROSS-REFERENCE TO RELATED APPLICATIONS

This application is a continuation of pending U.S. patent application Ser. No. 14/228,640, entitled: "PROVISION OF BROADBAND ACCESS TO AIRBORNE PLATFORMS", filed on Mar. 28, 2014, the contents of which are incorporated by reference in their entirety.

BACKGROUND OF THE INVENTION

Many aerial platforms such as airplanes and drones or Unmanned Aerial vehicles (UAVs) may desire broadband access.

A number of systems have in recent years been developed and deployed to provide internet access to aircraft. Some such systems are satellite based. Some such systems utilize Air To Ground (ATG) systems (e.g., using an 800 MHz band). Such ATG systems may deploy as many as one hundred or more cell sites across the U.S. to provide connectivity to the aircraft flying over the CONtinental U.S. (CONUS). These systems have been quite successful in providing connectivity to the passengers. The data rate requirements have, however, increased and there is a need for much higher data rates and at low cost. Multi-beam satellite systems, primarily deployed in the Ka band, can provide such high capacity. The satellite systems are, however, expensive because of the high cost of the space segment as well as the high cost of the satellite antennas. The Federal Communications Commission (FCC) has recently issued a Notice of Proposed Rule Making (NPRM) to allow the use of the Ku or 14-14.5 GHz band for the use of an ATG system.

The use of the 14-14.5 GHz band for ATG deployment is contingent upon protecting the incumbent satellite services in this band. The ATG cell sites must be designed in such a way as to achieve the low emission limits toward Geo-Stationary satellites that will be imposed by the FCC.

Thus, there is a need for a way to provide high speed broadband access that utilizes the Ku band having almost 500 MHz of spectrum to provide very high data rates cost efficiently while generating emissions that are within the imposed limits.

BRIEF SUMMARY OF THE INVENTION

Some embodiments allow air to ground (ATG) broadband access. Such access may be provided over a coverage area using multiple cell sites, where each cell site serves a portion of the coverage area. Each cell site may include at least one antenna sub-system and at least one radio sub-system. The cell site may be associated with multiple sectors that form the portion of the coverage area served by the cell site. Each cell site may include multiple antenna fixtures, where each antenna fixture may be associated with a different radio sub-system. The antenna fixtures may be arranged such that each antenna fixture is associated with a different sector.

Some embodiments may be able to send data from each cell site to one or more aerial platforms and/or receive data at the cell site from one or more aerial platforms. Each aerial platform may include a radio sub-system and antenna sub-system that are able to be communicatively coupled to at least one antenna sub-system (and associated radio sub-system) included in the cell site. Each aerial platform may select from among the sub-systems associated with different sectors based at least partly on a calculated quality measure associated with each available set of sector sub-systems. The aerial platform may initiate a handover from one sector to another based at least partly on a comparison of quality measures associated with each sector.

A first exemplary embodiment provides an ATG broadband access system including: multiple cell sites that together form a service coverage area, each cell site adapted to generate a local coverage area that forms a portion of the service coverage area, each sell site including: multiple antenna fixtures situated at a lower corner of the local coverage area, where the local coverage area includes a plurality of sectors and each antenna fixture is associated with a different sector than each other antenna fixture; and a radio sub-system connected to each antenna fixture, the radio sub-system including a transmitter capable of modulating and transmitting signals through the antenna fixture and a receiver capable of demodulating and decoding signals received through the antenna fixture; and at least one aerial platform including: at least one antenna fixture capable of forming beams toward the cell site; and a radio sub-system capable of modulating and transmitting signals and demodulating and decoding signals.

A second exemplary embodiment provides an automated method adapted to provide ATG broadband access service to a service coverage area. The method includes: dividing the service coverage area into multiple cell site coverage areas, each cell site coverage area including multiple sectors; providing multiple antenna fixtures associated with each cell site, each antenna fixture associated with a particular sector of the cell site coverage area; and providing a radio sub-system connected to each antenna fixture, wherein the radio sub-system is able to communicate with at least one aerial platform having at least one antenna fixture.

A third exemplary embodiment provides a system adapted to provide ATG broadband access. The system includes: multiple cell sites, each cell site including a radio sub-system and an antenna sub-system; at least one aircraft comprising a radio sub-system and an antenna sub-system capable of communicating with the cell site radio and antenna sub-systems; and at least one network that is able to be accessed by each cell site in the plurality of cell sites.

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide a way to deliver broadband access to aerial platforms.

Figure 1:
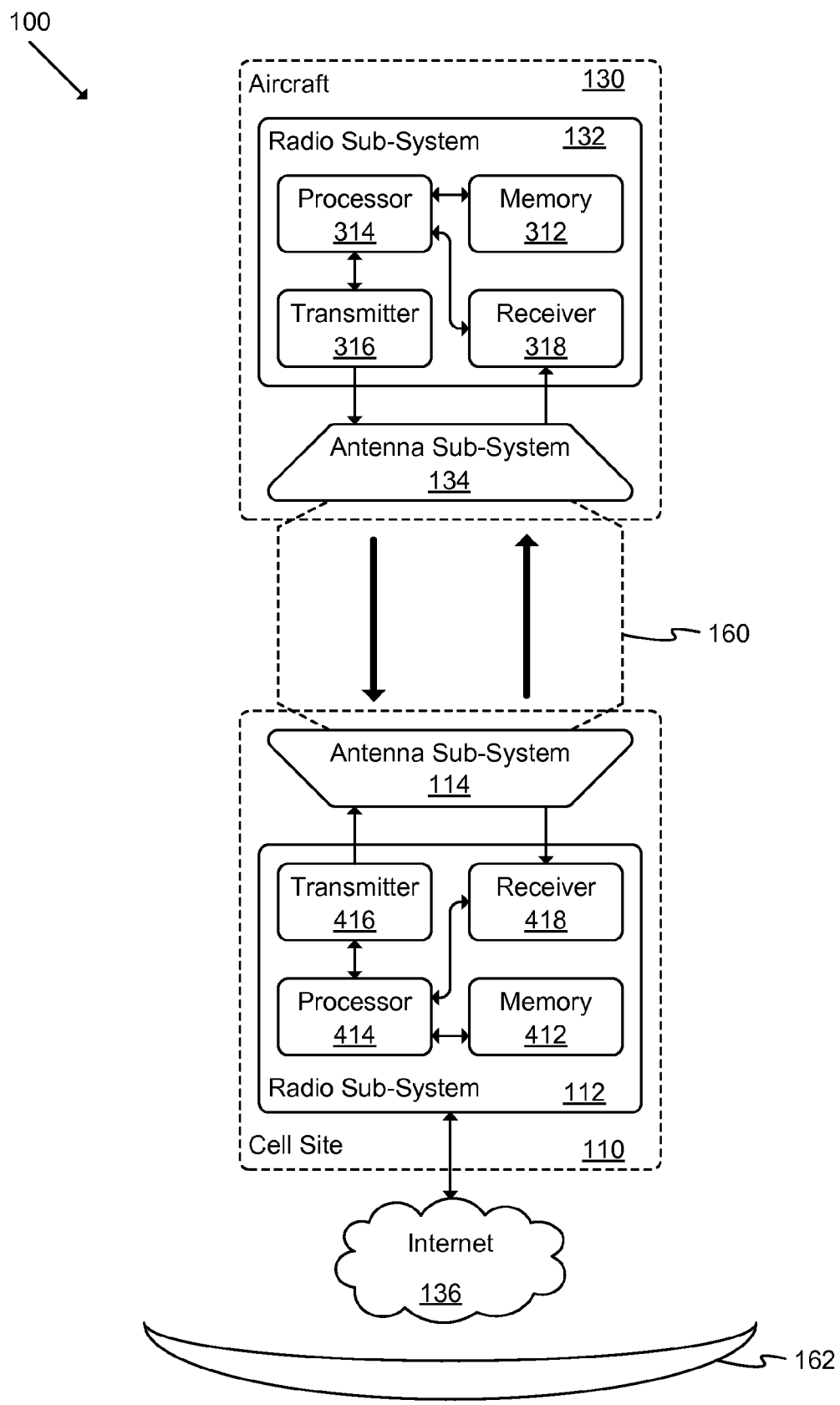
FIG. 1 illustrates a block diagram of a broadband internet access to aerial platform system according to an exemplary embodiment of the invention.

FIG. 1 illustrates a block diagram of a broadband internet access to aerial platform system 100 according to an exemplary embodiment of the invention. Such a system may be implemented as an ATG system having a number of ground cell sites 110 across the CONUS (and/or other appropriate regions).

Each cell site 110 may include a cell site antenna sub-system 114, a cell site radio sub-system 112, and/or other appropriate elements. The airborne platform 130 may be an aircraft, a drone or Unmanned Aerial Vehicle (UAV), helicopter, etc. Throughout this specification, the term aircraft may be used to refer to any of the above mentioned airborne vehicles (and/or other appropriate vehicles).

Each aircraft 130 may have an aircraft antenna sub-system 134 and an aircraft radio sub-system 132 attached to the antenna sub-system 134. The cell site antenna sub-system 114 may provide coverage to the aircraft 130 flying in its coverage area 160 while maintaining emissions toward a geo-arc 162 that are below a specified limit. Such a geo-arc may include multiple satellites. The cell site radio sub-system 112 may include a transmitter 416 adapted to modulate data and send the data through the antenna fixture 114; a receiver 418 adapted to demodulate and decode the signal received from the antenna fixture 114; a processor 414 adapted to perform functions such as controlling the transmitter and receiver, executing handoffs, scheduling transmissions on downlink and uplink, and determining what data to send to the aerial platforms among other tasks; memory sub-system 412 may store program code, configuration data and/or system parameters.

The aerial platform radio sub-system 132 may include the same functional sub-elements as that of the cell site radio-sub-system 112: aerial platform memory 312, processor 314, transmitter 316 and receiver 318 sub-systems respectively. Cell site 110 may be connected to the internet 136 (and/or other networks such as local area networks, wireless networks, cellular networks, etc.). The cell site 110 may be connected to the internet 136 (and/or other networks) via one or more network interfaces. The radio communication protocol supported by the radio sub-systems 112 and 132 must be able to schedule transmissions to the different aircraft in its coverage area, compensate for the large Doppler frequency caused by the high speed of the aircraft, and operate at large distances (e.g., three hundred kilometers or more).

Since the distance between the aircraft and the cell site may be quite large, and it is also desirable to achieve high data rates to the aircraft, the cell site antenna sub-system 114 may be able to transmit high Effective Isotropic Radiated Power (EIRP) toward the aircraft 130 while limiting the emission toward the geo-satellite 162.

Figure 2:
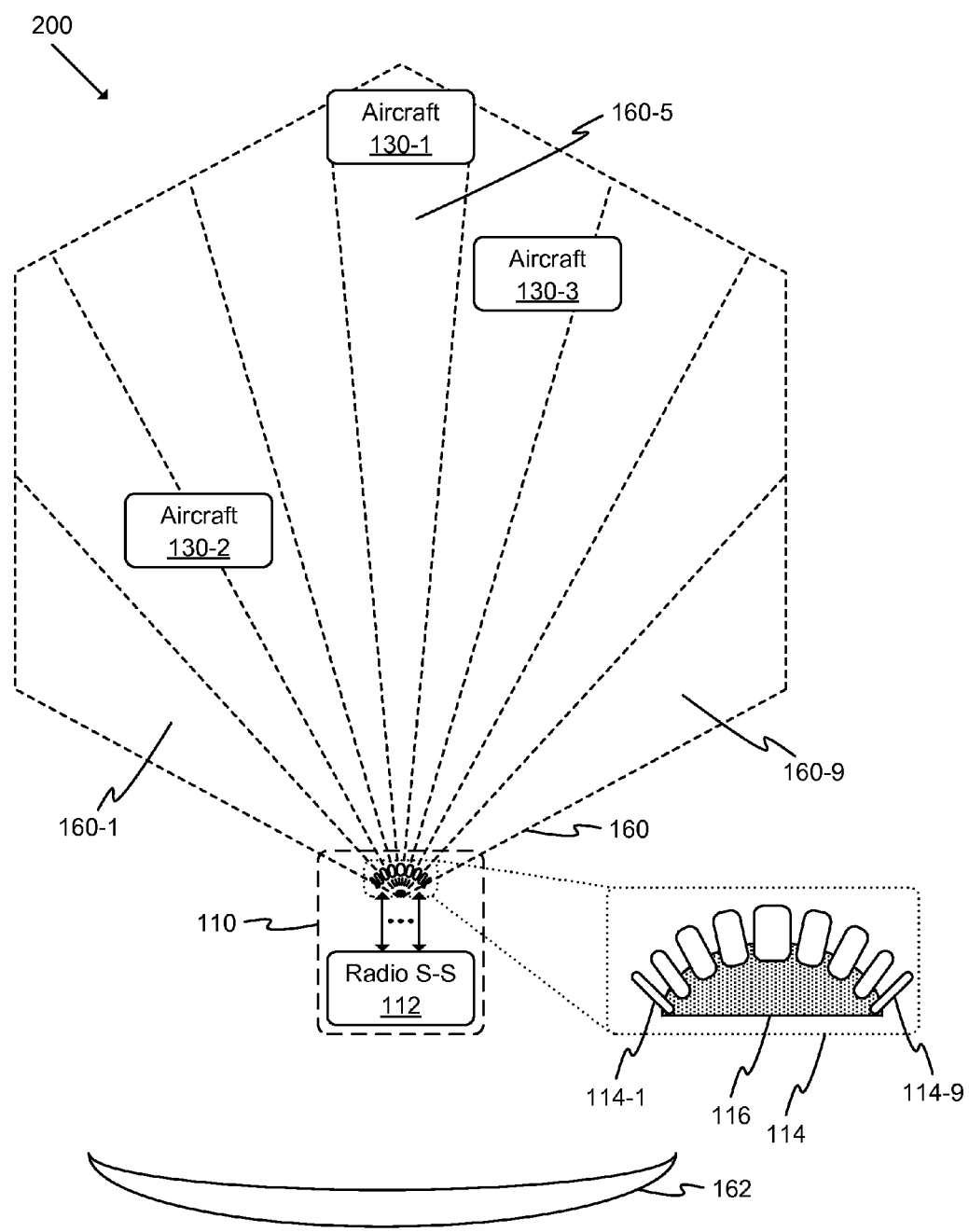
FIG. 2 illustrates a block diagram of a sectored cell site of some embodiments.

FIG. 2 illustrates a block diagram of a sectored cell site 200 of some embodiments. In this example, coverage may be provided to multiple aircrafts 130-1, 130-2, 130-3 in an angular area 160 of ±60 degrees, as shown. The coverage area 160 may be divided into, for example, nine sectors 160-1 . . . 160-9. Each sub-sector may be covered by a corresponding antenna panel 114-1 . . . 114-9. The antenna of the sector 160-5 in the middle of area 160, must cover the largest distance as the sector 160-5 encompasses the diameter of the hexagon 160. Therefore, the antenna panel 114-5 corresponding to sector 160-5 must provide the highest gain and have the largest area or size compared to the panels corresponding to other sectors. The sector on the far left 160-1 and the sector on the far right 160-9 cover the smallest distance, and therefore the corresponding antenna panels 114-1 and 114-9 may have the smallest gain and size.

The antenna gain difference between the left-most sector 160-1 and that of the middle sector 160-5 may be computed by normalizing the side of the hexagonal coverage area 160 to be unity. Then, the distance from the lower corner of the cell site 110 where the antenna panels 114-1 . . . 114-9 are installed to the farthest corner of the middle sector 160-5 is two, whereas the distance to the corner of the left-most sector 160-1 is unity. Assuming free space propagation, the path loss to the farthest corner for the middle sector 160-5 is six dB higher than that of the left-most sector 160-1. Thus, to achieve the same signal strength at the edge of the two sectors 160-1 and 160-5, the antenna panel 114-1 associated with sector 160-1 may be four times narrower in width than that of the panel 114-5 associated with the middle sector 160-5. Therefore, in order to minimize the area that the antenna panels 114-1 . . . 114-9 occupy, the size of each antenna panel may be chosen to achieve the same signal strength at the edge of the coverage area of the different sectors 160-1 . . . 160-9. Each antenna panel 114-1 . . . 114-9 may be oriented toward the farthest point in the associated sector 160-1 . . . 160-9. Therefore, as shown in a magnified view of the antenna sub-system 114, the antenna panels 114-1 . . . 114-9 may be installed on a curved structure 116 at the edge of the hexagonal area 160 taking into account the changing orientation and width of each panel 114-1 . . . 114-9 to achieve the same signal strength at the outer edge of each corresponding sector 160-1 . . . 160-9.

In the following description, suffix -j, j an integer, may be used to depict the "j-th" instantiation of a component. As an aircraft is moving from the coverage area of sector 160-j to sector 160-(j+1), the aircraft may be handed off from the cell site radio sub-system 112-j serving sector 160-j to cell site radio sub-system 112-(j+1) serving sector 160-(j+1). Each radio sub-system 112-j may be associated with one or more antenna systems 114-j.

The 14-14.5 GHz band being considered for ATG application may be used in a Time Division Duplex (TDD) manner, where either an aircraft or a cell site is transmitting on the frequency band at a given time. Therefore, an air interface which can be configured in a TDD fashion is needed. One such air interface is a variation of Carrier Sense Multiple Access/Collision Detection (CSMA/CD). The advantage of a protocol similar to the CSMA/CD is that it allows dynamic allocation of bandwidth on the downlink (cell site to aircraft) and on the uplink (aircraft to cell site). In CSMA/CD protocols such as the one used in the 802.11 family of standards, also known as "wifi", a receiver associated with each communication device (e.g., components associated with an aircraft or a cell site) may monitor the channel to determine whether the channel is idle (i.e., no device is transmitting). Once the channel is found to be idle, then each device will further wait a random time period, referred to as backoff time. If a device finds the channel is still idle at the end of the backoff period, then the device may begin transmission. The random backoff wait time before transmission is intended to minimize probability of collisions, included as part of the collision detection (or avoidance) of the protocol.

There are, however, situations where some of the devices in the network cannot detect transmissions of some other devices, referred to as the "hidden node" problem. In cases where two devices cannot receive each other's signals, a second device may start transmission while the first device is also transmitting, because the second device cannot detect that the first device is transmitting. To remedy the hidden node issue, some protocols such as the 802.11 standard have a mechanism referred to as Request To Send/Clear To Send (RTS/CTS). A device upon finding that the channel is idle sends an RTS message to some central Access Point (AP) requesting permission to use the channel for a certain time interval. The AP is in a location where it can receive signals from all other devices within a certain area. The AP upon reception of the RTS packet from a device will send a CTS message granting the request of the device. The CTS packet will also contain a data field that contains the length of time the device is allowed to occupy the channel. Since all devices in the network can receive signals from the AP, the devices all decode the CTS packet, read the data field indicating the length of time the channel will be occupied, and will avoid accessing the channel during the reserved time period.

The hidden node problem described above is particularly problematic in an ATG application. If the aircraft antenna is directional and is pointing toward the cell site, then it is easy to see that two different aircraft traveling along a line parallel to a cell site cannot receive each other's transmissions. Due to the large ATG cell site radius of as high as, for example, three hundred kilometers, the RTS/CTS mechanism described above cannot solve the hidden node problem in the ATG application. The example sectored cell site 200 of FIG. 2 shows an aircraft 130-1 at a cell edge which may be, for example, three hundred kilometers from the cell site 110, and an aircraft 130-2 closer to the cell site 110 (e.g., thirty kilometers from the cell site).

The propagation delay from the aircrafts 130-1 and 130-2 to the cell site may be, for example, one millisecond and one tenth of a millisecond respectively. It may take slightly more than two tenths of a millisecond for aircraft 130-2 to send an RTS and receive a CTS from the cell site 110. Then, aircraft 130-2 may start transmission believing it has clear use of the channel. Aircraft 130-1, however, may only see the CTS about eight tenths of a millisecond after aircraft 130-2 has received the CTS. Therefore, during the eight tenths of a millisecond time interval aircraft 130-1 will see the channel as idle and may attempt to acquire the channel, thereby causing a collision with data transmission of aircraft 130-2. The reason RTS/CTS works well in the wireless local area network application is that the relative delay of different devices to the AP is very small. Therefore, a different mechanism is required to avoid collision among different aircraft transmitters.

In some embodiments, channel bandwidth allocated to the downlink and to the uplink is the same. In other words, for a certain time period the cell site radio sub-system 112 may transmit on the entire channel bandwidth on the downlink, and then the different aircraft radio sub-systems may take turns to transmit on the uplink. The following discussion describes a data transmission cycle whereby the aircraft (via radio sub-system 132) register with the cell site radio sub-system 112, which schedules downlink and uplink transmissions for the equal downlink/uplink bandwidth scenario.

Figure 3A:
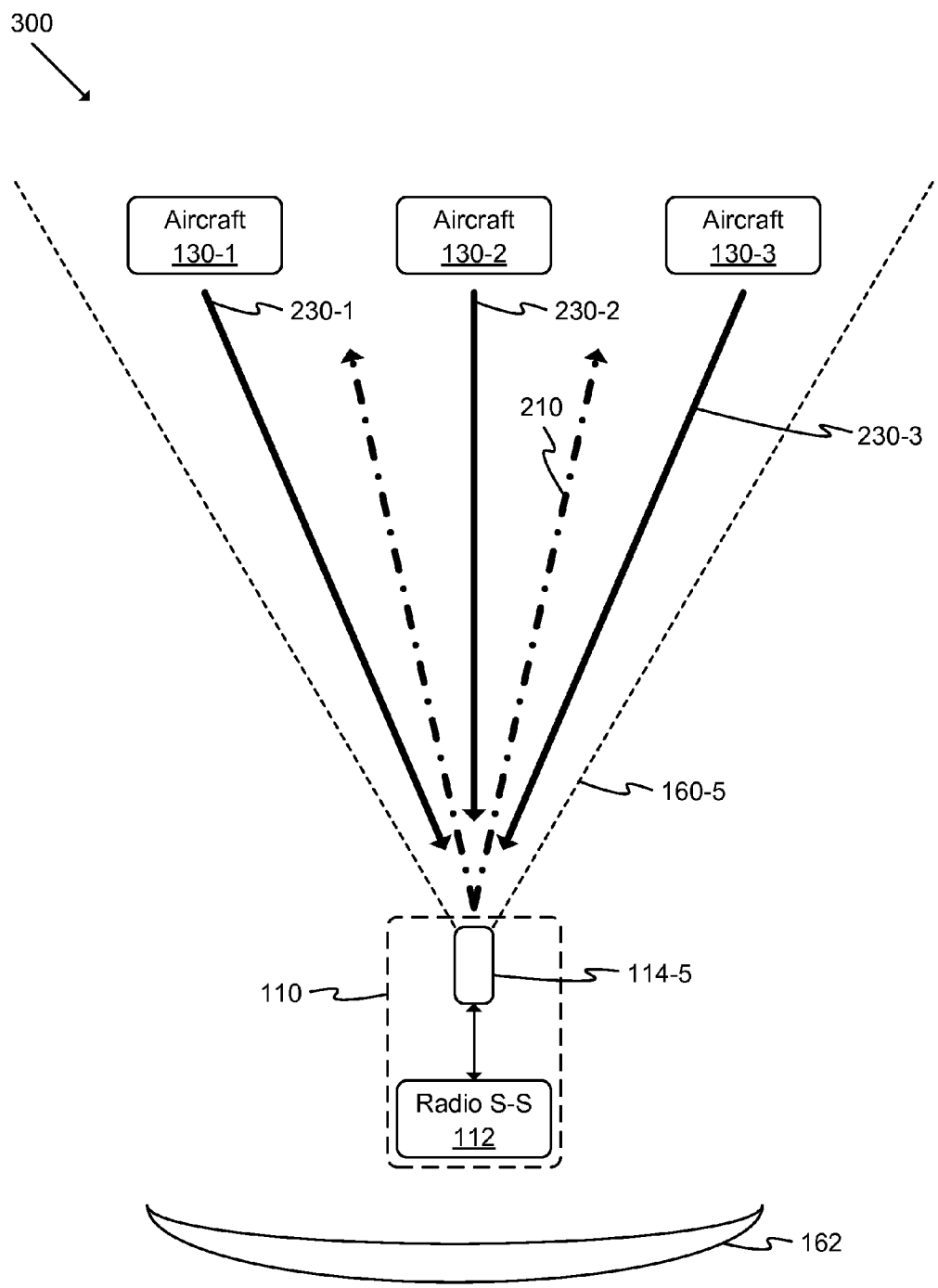
FIG. 3A illustrates a block diagram of a system that allows communication among cell sites and aerial platforms.
Figure 3B:
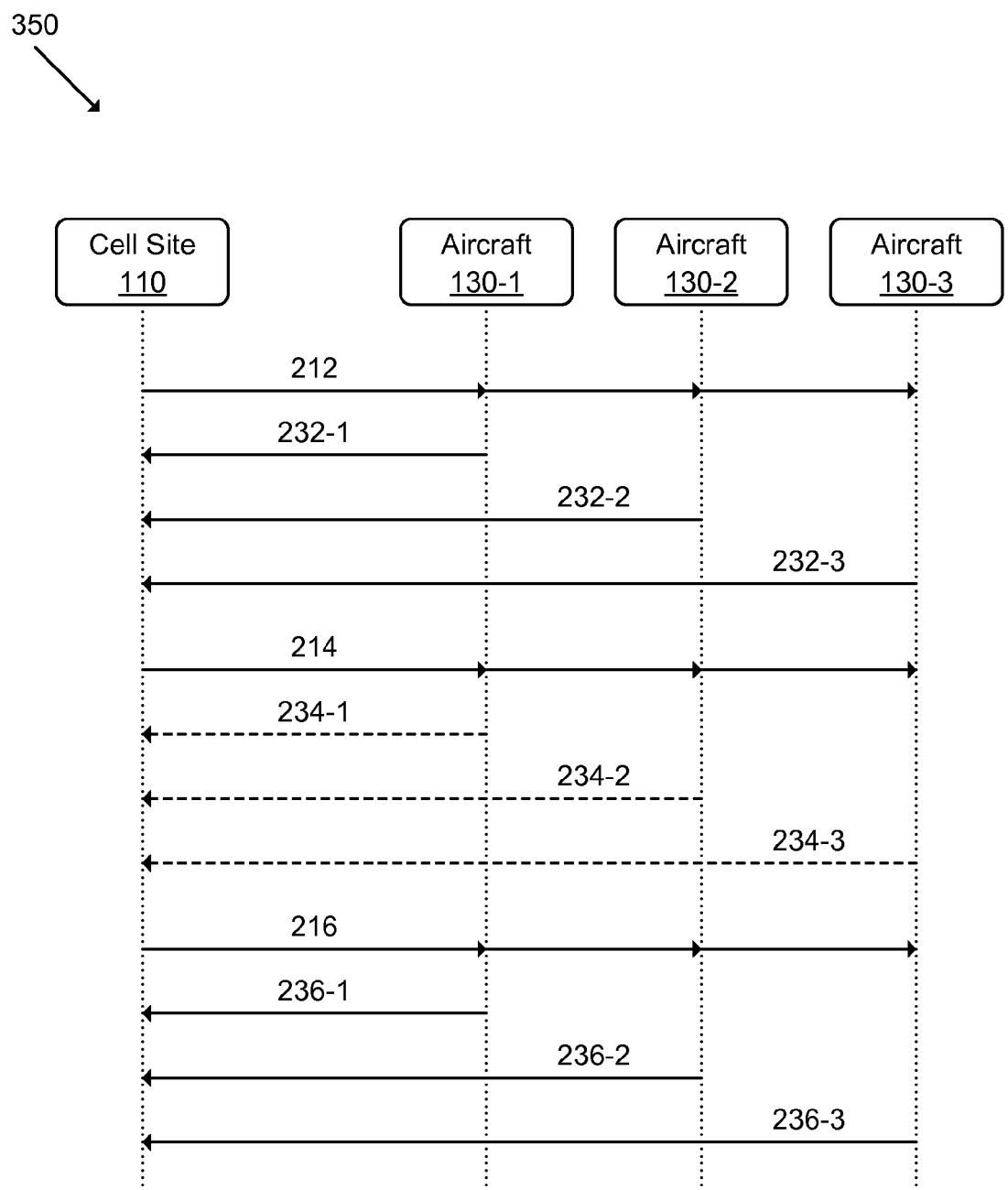
FIG. 3B illustrates a message flow diagram of a conceptual communication scheme that allows message flow among cell sites and aerial platforms.

FIG. 3A illustrates a block diagram of a system 300 that allows communication among cell sites 110 and aerial platforms 130-1, 130-2, and 130-3. FIG. 3B illustrates a message flow sequence 350 of a conceptual communication scheme that allows message flow among cell sites 110 and aerial platforms 130-1, 130-2, and 130-3.

In the example of FIG. 3A, three aircraft 130-1, 130-2, and 130-3 are located in a single sector 160-5. The cell site 110 may transmit signals 210 to the aircraft 130-1, 130-2, and 130-3. Such transmissions may provide various beacons, messages, data packets, and/or other appropriate information. Likewise, each aircraft 130-1, 130-2, and 130-3 may transmit a signal 230-1, 230-2, and 230-3, respectively, to the cell site 110. Such transmissions may include various messages, data packets, and/or other appropriate information.

The example of FIG. 3B shows a message flow sequence 350 among multiple aircraft 130-j (j=1, 2, 3 in this example) and cell site radio sub-system 112. Each aircraft 130-j (j=1, 2, 3) may detect beacon signals 212 sent by cell site radio sub-system 112, send association messages 232-j to the cell site, send a bandwidth request message 234-j for uplink data transmissions, receive a grant message 214 from the cell site 110, and then send data via packets 236-j to the cell site 110.

The cell site, via radio sub-system 112, associated with the sector 160-5 may send data packets 216-1, 216-2, and 216-3 to aircraft 130-1, 130-2, and 130-3, respectively. Periodically, cell site radio sub-system 112 may transmit a beacon signal 212 to all aircraft in the sector. Each aircraft 130-j (j=1, 2, 3) at power up may search all frequency channels in a listing of available channels until a beacon signal 212 is detected. Aircraft radio sub-systems 132-j (j=1, 2, 3) may search a given frequency channel for at least a length of time that spans one beacon transmission period from the cell site radio sub-system 112. The beacon transmission period is a default number known to all aircraft radio sub-systems. Upon receiving the beacon signal 212, aircraft radio sub-system 132-j may send an association message 232-j to the cell site radio sub-system 112 to register with the system. The association message 232-j may also contain a bandwidth request from aircraft 130-_j_. Since the association message 232-_j_ is quite short and the relative delay of different aircraft in a sector are much larger than the duration of the association packet, there is a negligible probability that association packets from different aircraft will collide.

The cell site processor 414 may schedule time for the different aircraft 130-_j_ in the sector 160-5 (or sectors) and may send a bandwidth grant message 214 to all aircraft in the sector 160-5 with information on when the different aircraft may send data and how long each aircraft may occupy the channel. Since the cell site radio sub-system 112 has information on the location of the different aircraft in a sector, a scheduler may delay different aircraft transmissions in such a way that each aircraft starts transmission as soon as possible while avoiding packet overlap at the cell site receiver 418. Each aircraft 130-_j_ may send data packets 236-_j_ to the cell site radio sub-system 112. Each aircraft 130-_j_ may send an explicit bandwidth request message 234-_j_, or piggyback the bandwidth request on the last data packet 236-_j_ to request bandwidth for the next data round.

Figure 4:
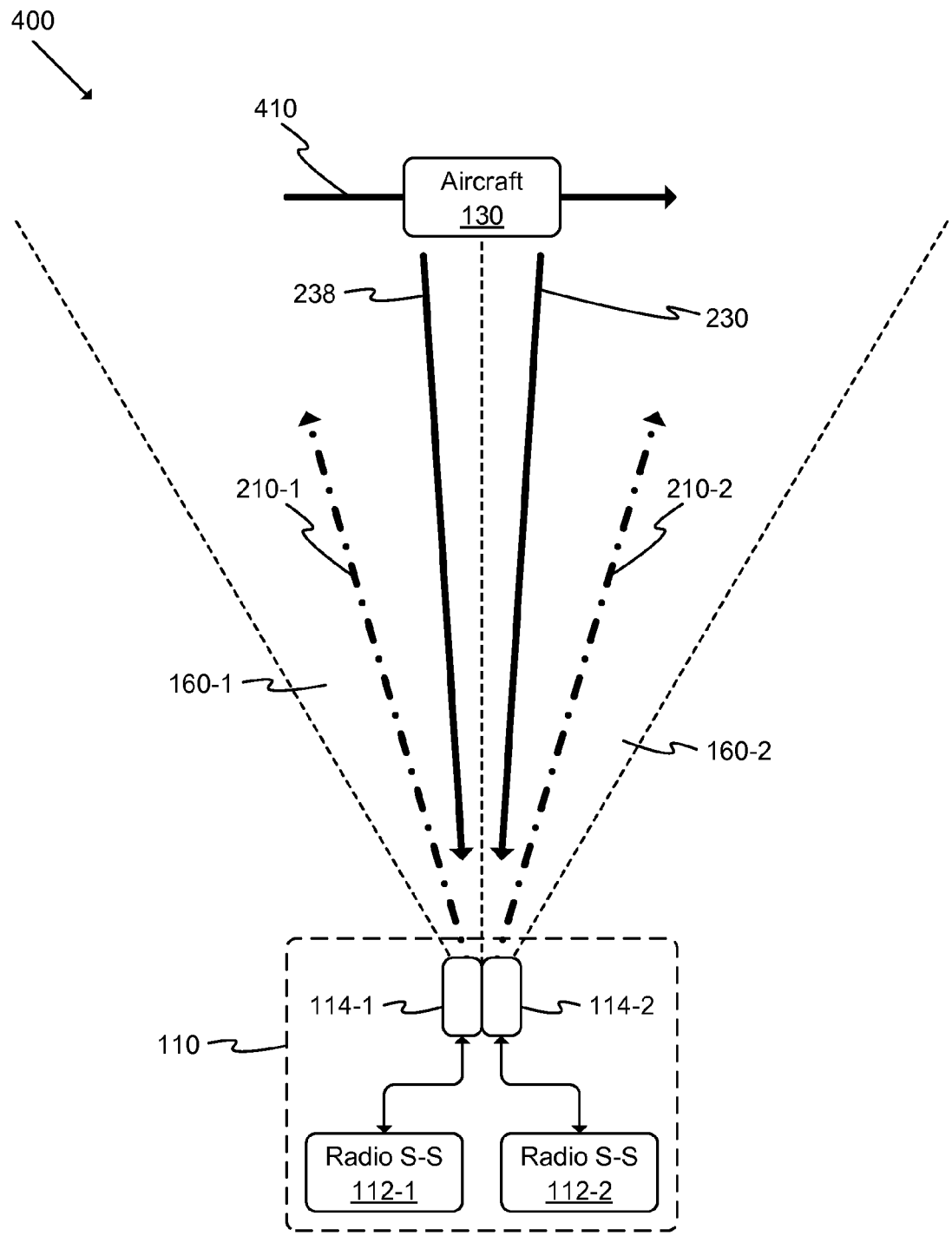
FIG. 4 illustrates a block diagram of a system of some embodiments showing movement of an aerial platform from a first sector to a second sector of a sectored cell site.

FIG. 4 illustrates a block diagram of a system 400 of some embodiments showing movement of an aerial platform 130 from a first sector 160-1 to a second sector 160-2 of a sectored cell site 110. In this example, the aircraft 130 is moving along a straight-line path 410 at the boundary of sector 160-1 and sector 160-2. As the aircraft 130 enters sector 160-2, the radio sub-system 132 associated with the aircraft 130 must at some point stop communicating with radio sub-system 112-1 and start communicating with radio sub-system 112-2, referred to as a handoff from sector 160-1 to sector 160-2.

One approach to detecting when to carry out handoff involves monitoring the position coordinates of the aircraft 130 and initiating handoff when the aircraft crosses a boundary between two sectors. If handoff is needed, then the aerial platform radio sub-system 132 may send a communication 230 including an association message 232, and a bandwidth request message 234 to the radio sub-system 112-2 associated with sector 160-2. The aircraft radio sub-system 132 may also send a disassociation message 238 to the radio sub-system 112-1 associated with the current sector 160-1 informing that the aircraft 130 intends to stop communicating with the current sub-system 112-1. Cell site radio sub-system 112-2 in turn may send a communication 210-2 including a beacon signal 212-2 and a bandwidth grant message 214-2 to the aircraft 130 acknowledging the association as well assigning bandwidth on the uplink to the aircraft. This message transaction sequence completes the handoff.

Instead of using aircraft position location to initiate handoff, the aircraft radio sub-system 132 may estimate a quality measure, such as Signal to Interference to Noise Ratio (SINR) on the transmission 210-1 from cell site radio sub-system 112-1, which may include a beacon signal and/or data packets. If the SINR drops below a threshold handoff may be initiated.

Also, the aircraft radio sub-system 132 may send the aircraft position, as well as SINR measurements on the beacons sent by each sector, to the cell site 110 and allow the cell site radio sub-system 112 to initiate handoff.

In another aspect of handoff initiation scheme, the aircraft radio sub-system 132 may contain an additional receiver that searches for frequencies in adjacent sectors and estimates SINR of the beacon signals sent in adjacent sectors. When SINR of a beacon signal in an adjacent sector 160-2 becomes stronger than the SINR of the signal received in the current sector 160-1, the handoff may be initiated.

Adjacent sectors may use different frequencies or different antenna polarizations. Therefore, the aircraft radio sub-system 132 must search at least a second frequency being transmitted by any adjacent sectors, while receiving on a first frequency being transmitted by the current serving sector. Moreover, if adjacent sectors have different antenna polarization, then the aircraft antenna sub-system must also have two different polarizations and the aircraft radio sub-system must search a second antenna polarization for beacons sent from adjacent sectors, while receiving data on a first polarization from the current serving sector.

One of ordinary skill in the art will recognize that the systems, components, and/or features described above in reference to FIGS. 1-4 may be implemented in various different ways without departing from the spirit of the invention. For instance, different embodiments may include different specific components (e.g., additional components, omitted components, merged components, divided components, etc.). In addition, different embodiments may include different specific numbers of components (e.g., number of sectors and thus associated system elements for each cell site, different numbers of aircraft, etc.) than those described above.

Figure 5:
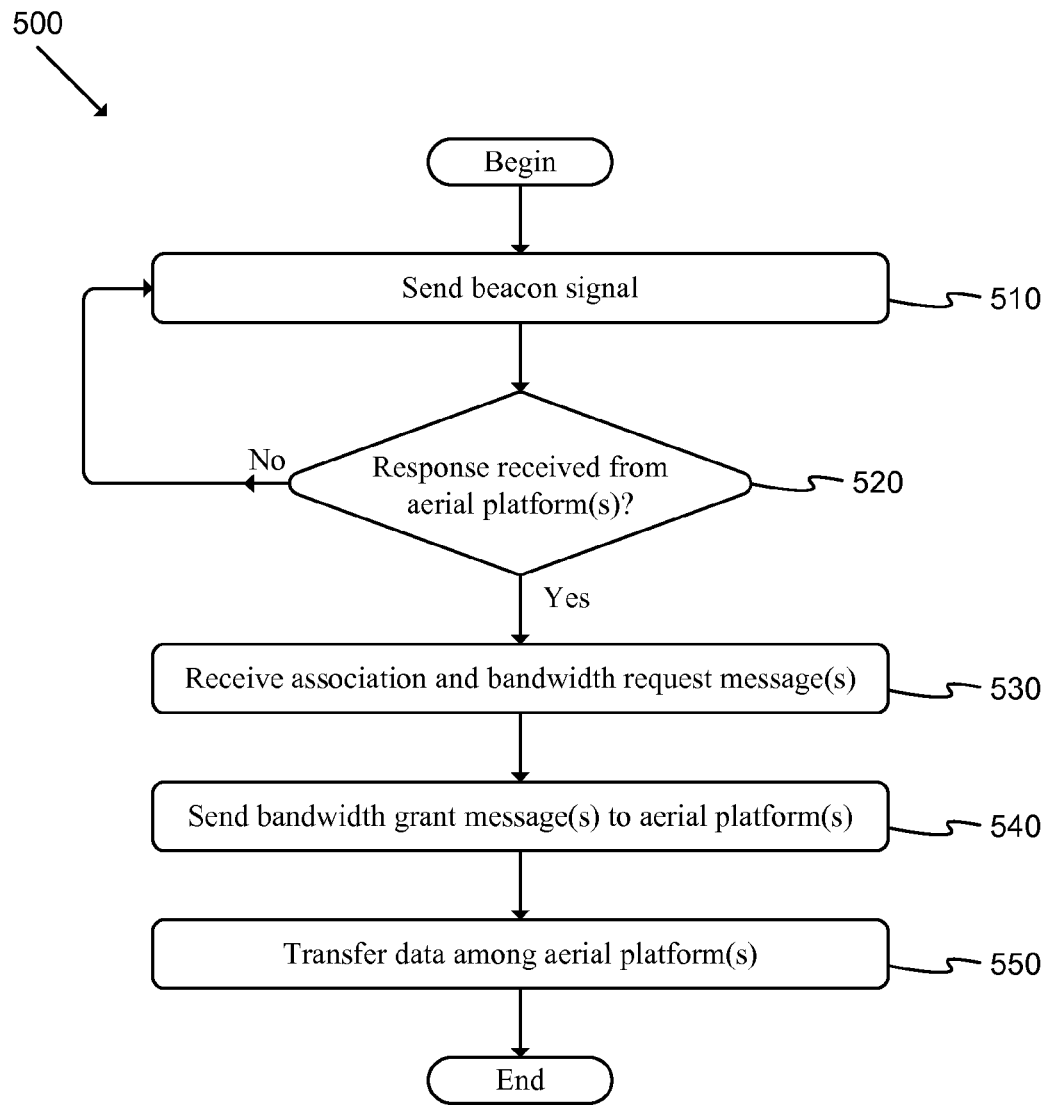
FIG. 5 illustrates a flow chart of a conceptual process used by some embodiments to associate an aerial platform with a cell site.

FIG. 5 illustrates a flow chart of a conceptual process 500 used by some embodiments to associate an aerial platform with a cell site. Such a process may begin, for instance, when a cell site of some embodiments is powered on. Such a process may be implemented using systems having features such as those described above in reference to FIGS. 1-4. Although process 500 is described from the perspective of the cell site, one of ordinary skill in the art will recognize that a complementary process may be implemented from the perspective of the aircraft.

The process may allow aerial platform radio sub-systems to acquire a channel and to send and/or receive data. As shown, the process may send (at 510) one or more beacon signals to any aerial platforms within receiving range. Next, the process may determine (at 520) whether a response has been received from any aerial platforms. Such a response may be generated by using the aerial platform radio sub-system to decode the beacon signal. If the process determines that no response has been received, the process may repeat operations 510-520 until the process determines (at 520) that a response has been received.

If the process determines (at 520) that a response has been received, the process may receive (at 530) association and bandwidth request messages included with the response. Next, the process may send (at 540) bandwidth grant messages to any responding aerial platforms. Such messages may specify the time each aerial platform is allowed to start transmission, the length of time each aerial platform is allowed to occupy the channel, and the frequency channel on which the platform will transmit. The process may then transfer (at 550) data among any responding aerial platforms during the scheduled time period for each platform and then may end.

In some embodiments, in order to minimize interference at the sector boundaries, aerial platforms and cell site radio sub-systems may use different frequencies in adjacent sectors. The available spectrum may be divided into even and odd numbered frequency channels. Then, frequency channels may be assigned to the sectors in an even and odd pattern. In other words, frequency channels used for communication among the aerial platforms and cell site radio sub-systems in each sector are different from any adjacent sector. This results in a frequency reuse of two pattern in the sense that each frequency channel gets used in one of two sectors.

In some embodiments, the available frequency band is divided into an arbitrary number of frequency channels and the alternating sectors are assigned the same channels but the adjacent sectors use different antenna polarization, either vertical and horizontal polarizations or left and right circular polarizations.

During each data transmission cycle, the cell site radio sub-system at the end of the downlink data transmission time interval may send a downlink group acknowledgement packet to inform the aircraft what packets were received correctly from each aerial radio sub-system during the last data transmission cycle. Each aircraft may, in turn, during the uplink transmission time interval associated with the aircraft, send an uplink group acknowledgement packet to the cell site radio sub-system acknowledging the packets received correctly from the cell site radio sub-system in the current cycle.

Asymmetric channel bandwidth may be used on the downlink and uplink. Some embodiments may divide the available channel bandwidth into a number of smaller channels and assign each channel to a different aircraft during uplink transmissions. The difference between this scheme and the one described above in reference to FIG. 3 is that the different aircraft transmit their data on the uplink in parallel but on narrower channel bandwidth.

Before sending a packet, the cell site radio sub-system and aerial platform radio sub-system must determine at what data rate to send the packet. The ATG propagation channel is mostly line of sight with negligible multipath fading. However, the aerial platform roll and pitch may change the aerial platform antenna gain toward the cell site resulting in a change in SINR. Moreover, as the aerial platform moves toward or away from the cell site, SINR may change due to the change in path loss. Note that the path loss from the aerial platform to the cell site is impacted by the antenna gains at the two sides as well as the distance between the two. Since the antennas at the two end are directional, their gains depend on the azimuth and elevation angles from the aerial platform to the cell site. These azimuth and elevation angles change as the aerial platform travels. Since the aerial platform roll and pitch occur on the order of seconds, then path loss between the aerial platform and the cell site changes slowly due to the large distances between the two. Therefore, the SINR is expected to be reasonably stable over a few tens of milliseconds. For a system with cell site radius of as high as three hundred kilometers, the round trip propagation delay is two milliseconds. A data cycle of twenty milliseconds is reasonable to use; resulting in a 90% usage of the channel as two milliseconds is allocated to guard time because of propagation delay. Twenty milliseconds is also short enough so that the SINR in the ATG environment does not change much during that interval.

During each data cycle, the aerial platform radio sub-system may estimate the received SINR from the data packets sent by the cell site radio sub-system, and choose a data rate that the sub-system may be able to decode with high probability. Then, the aerial platform radio sub-system may send the index of the chosen data rate to the cell site radio sub-system piggybacked on a packet such as an acknowledgment packet, a data packet or some other message. In the next data cycle, the cell site radio sub-system may use the specified data rate index to transmit data to the aerial platform radio sub-system. Similarly, the cell site radio sub-system may estimate the SINR received from each aerial platform and send the index of the data rate that is decodable with high probability at the measured SINR to aerial platform radio sub-system. The aerial platform radio sub-system may use the chosen data rate to send data to the cell site radio sub-system in the next data cycle. Alternatively to or conjunctively with the SINR estimate, the receivers may use some other metric such as packet error rate or some other signal quality indicator to choose a data rate that is decodable with high probability.

Figure 6:
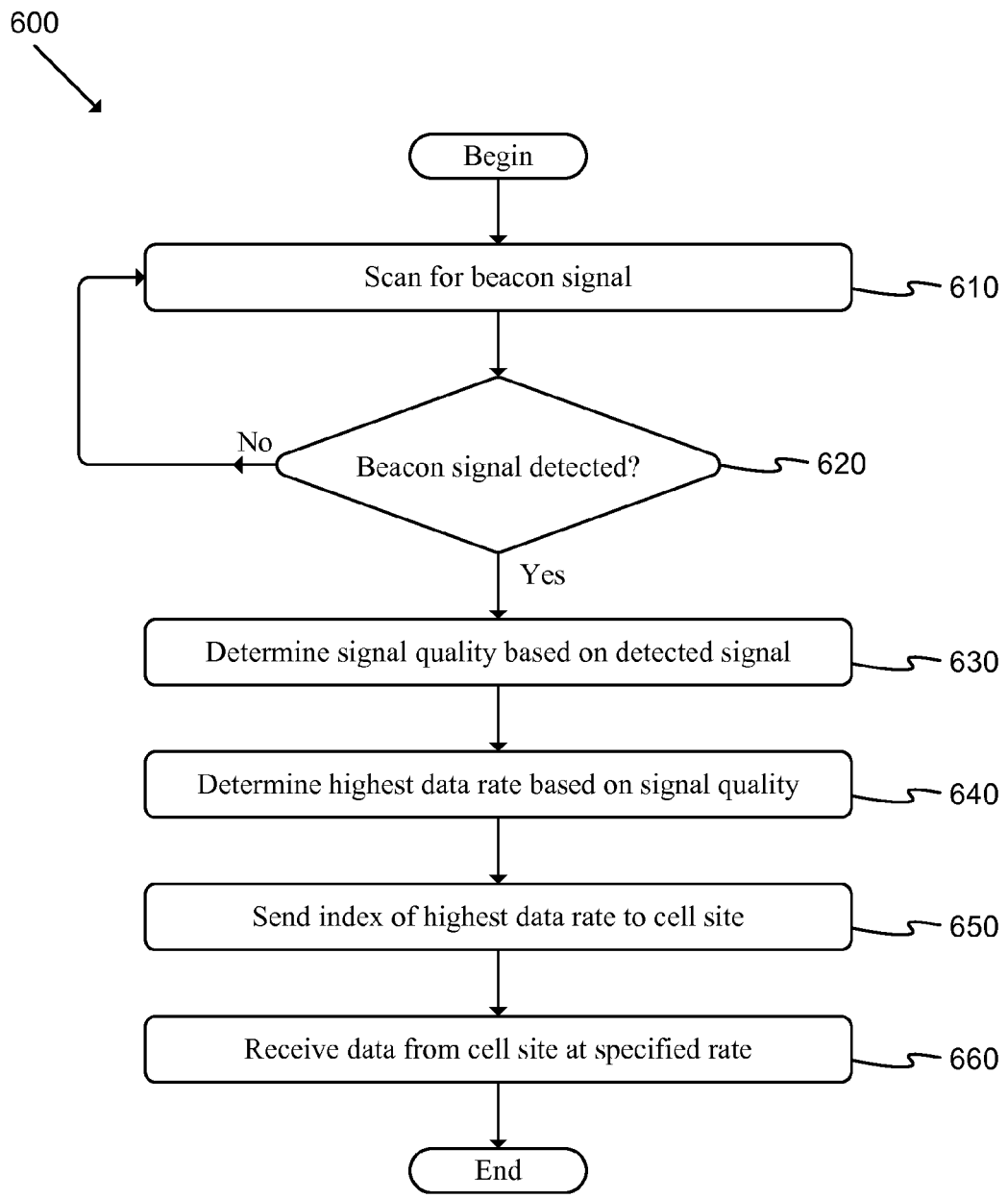
FIG. 6 illustrates a flow chart of a conceptual process used by some embodiments to determine the data rate at which the cell site transmits data to the aerial platform.

FIG. 6 illustrates a flow chart of a conceptual process 600 used by some embodiments to determine the data rate at which the cell site transmits data to the aerial platform. Such a process may begin, for instance, when an aircraft radio sub-system of some embodiments is activated. Such a process may be implemented using systems having features such as those described above in reference to FIGS. 1-4. Although process 600 is described from the perspective of the aircraft, one of ordinary skill in the art will recognize that a complementary process may be implemented from the perspective of the cell site.

As shown, the process may scan (at 610) for a beacon signal. Such a beacon signal may be generated by a cell site radio sub-system of some embodiments. Next, the process may determine (at 620) whether a beacon signal has been detected. If the process determines (at 620) that no beacon signal has been detected, the process may repeat operations 610-620 until the process determines (at 620) that a beacon signal has been detected.

If the process determines (at 620) that a beacon signal has been detected, the process may then determine (at 630) signal quality based at least partly on the detected signal. The aerial platform radio sub-system receivers of some embodiments may detect and demodulate the message sent by the cell site radio sub-system, and estimate a signal quality measure such as SINR on the received signal/message. Next, the process may determine (at 640) the highest data rate based on the determined signal quality. The aerial platform radio sub-system may determine the highest data rate that the sub-system is able to decode correctly with high probability given the measured signal quality. The process may then send (at 650) the index of the determined data rate to the cell site.

Process 600 may then receive (at 660) data from the cell site at the specified rate and then may end. The cell site radio sub-system of some embodiments may transmit data to each aerial platform at the data rate specified by the corresponding aerial platform.

A process similar to process 600 may be used to determine the data rate for data sent from the aerial platforms to the cell site, but with aerial platform and cell site roles reversed. As above, a complementary process may be implemented from the perspective of the cell site.

Figure 7:
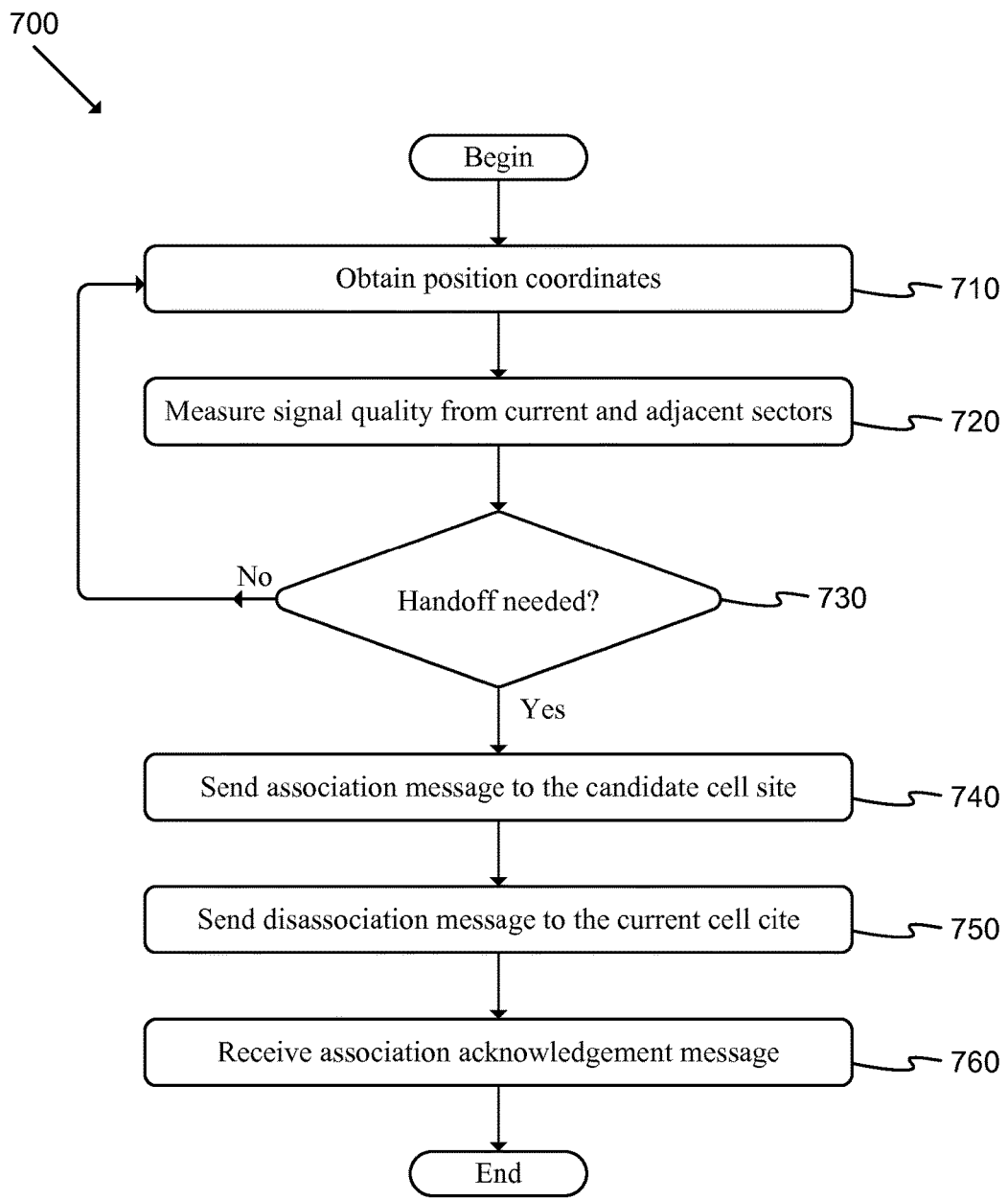
FIG. 7 illustrates a flow chart of a conceptual process used by some embodiments to determine the need for handoff, and to carry out handoff between the aerial platform and adjacent cell sites.

FIG. 7 illustrates a flow chart of a conceptual process 700 used by some embodiments to determine the need for handoff, and to carry out handoff between the aerial platform and adjacent cell sites (or sectors). Such a process may begin, for instance, when an aircraft nears a boundary between sectors (where the sectors may be associated with a single cell site, or each sector may be associated with a different cell site). Such a process may be implemented using systems having features such as those described above in reference to FIGS. 1-4. Although process 700 is described from the perspective of the aircraft, one of ordinary skill in the art will recognize that a complementary process may be implemented from the perspective of the cell site.

As shown, an aerial platform radio sub-system may obtain (at 710) the platform's position coordinates and measure (at 720) signal quality from current and adjacent sectors (or cell sites). The signal quality, such as SINR, of the beacon signals received from the current and adjacent sectors may be determined in various appropriate ways.

Next, the process may determine (at 730) whether a handoff is needed. Such a determination may be made using the aerial platform processor to determine whether or not handoff is needed based at least partly on the position location of the aerial platform with respect to the different sectors, the relative strengths of the signal quality of beacons signals of the adjacent sectors, and/or other appropriate factors. If the process determines (at 730) that a handoff is not needed, the process may repeat operations 710-730 until the process determines (at 730) that handoff is needed.

If process 700 determines (at 730) that handoff is needed, the process may send (at 740) an association message to the candidate cell site (or sector). The process may also send (at 750) a disassociation message to the current cell site (or sector) radio system with which the aerial platform has been communicating. The process may receive (at 760) an association acknowledgement message from the candidate cell site (or sector) and then may end.

One of ordinary skill in the art will recognize that processes 500-700 are conceptual in nature and may be implemented in various different ways without departing from the spirit of the invention. For instance, different embodiments may omit one or more listed operations, include one or more other operations, and/or perform the operations in different orders than described above. In addition, each process may be implemented as a set of sub-processes and/or as a sub-process of a larger macro process. Each process (or a portion thereof) may be implemented iteratively.

Figure 8:
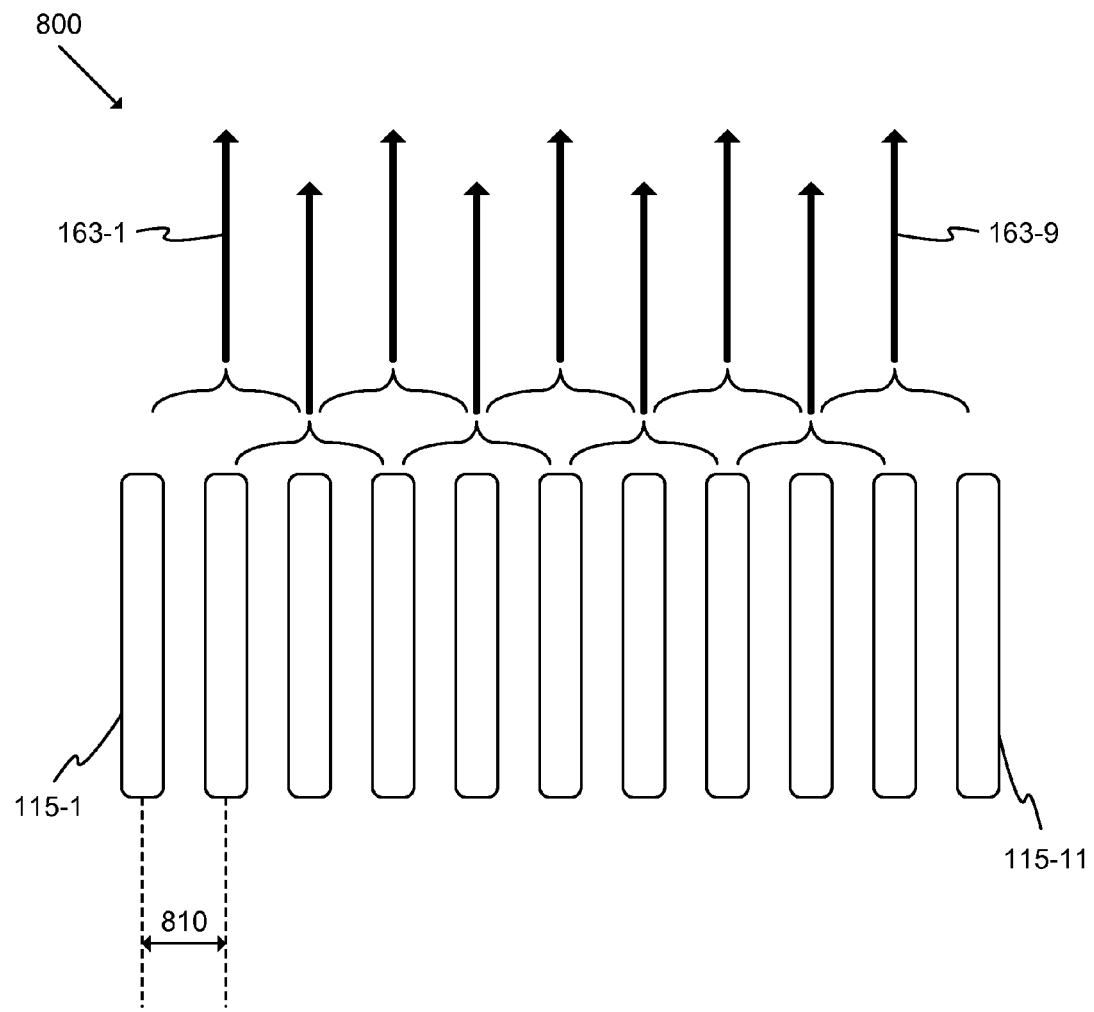
FIG. 8 illustrates a block diagram of a set of physical antennae used by some embodiments to generate a set of fixed beams.

FIG. 8 illustrates a block diagram of a set of physical antennae 800 used by some embodiments to generate a set of fixed beams 163-1 . . . 163-9. As described above in reference to FIG. 2 the antenna sub-system at the sectored cell site 200 may include a number of antenna fixtures equal to the number of sectors. One approach to reducing the size of the antenna sub-system is to introduce transmit and receive beam forming at the cell site, and thereby share antenna elements of the adjacent sectors in order to reduce the size of the overall antenna sub-system as described below.

To illustrate the scheme, the example of FIG. 8 uses beam forming on three antenna elements 115-1 . . . 115-11. Then, the beam for each sector (e.g., beam 163-1 which may correspond to sector 160-1 of FIG. 2) is generated by appropriately phasing the signals on three antenna elements (e.g., elements 115-1, 115-2, and 115-3) associated with that sector, where each antenna element has a width one third of that of an antenna fixture that does not use beam forming. This example includes nine sectors and nine antenna fixtures with each antenna fixture forming a fixed beam for the corresponding sector.

Assuming three way beam forming, eleven elements are needed to generate nine fixed beams for the nine sectors. Antenna elements must be spaced at half of the wavelength 810 or $\lambda/2$, where $\lambda$ denotes one wavelength.

Many of the processes and modules described above may be implemented as software processes that are specified as one or more sets of instructions recorded on a non-transitory storage medium. When these instructions are executed by one or more computational element(s) (e.g., microprocessors, microcontrollers, Digital Signal Processors (DSPs), Application-Specific ICs (ASICs), Field Programmable Gate Arrays (FPGAs), etc.) the instructions cause the computational element(s) to perform actions specified in the instructions.

One of ordinary skill in the art will recognize scheme 800 described above may be implemented in various different ways without departing from the spirit of the invention. For instance, different numbers of antenna elements and beams may be used. As another example, different numbers of elements may be combined to form each beam (e.g., 2, 4, 5, etc.).

Figure 9:
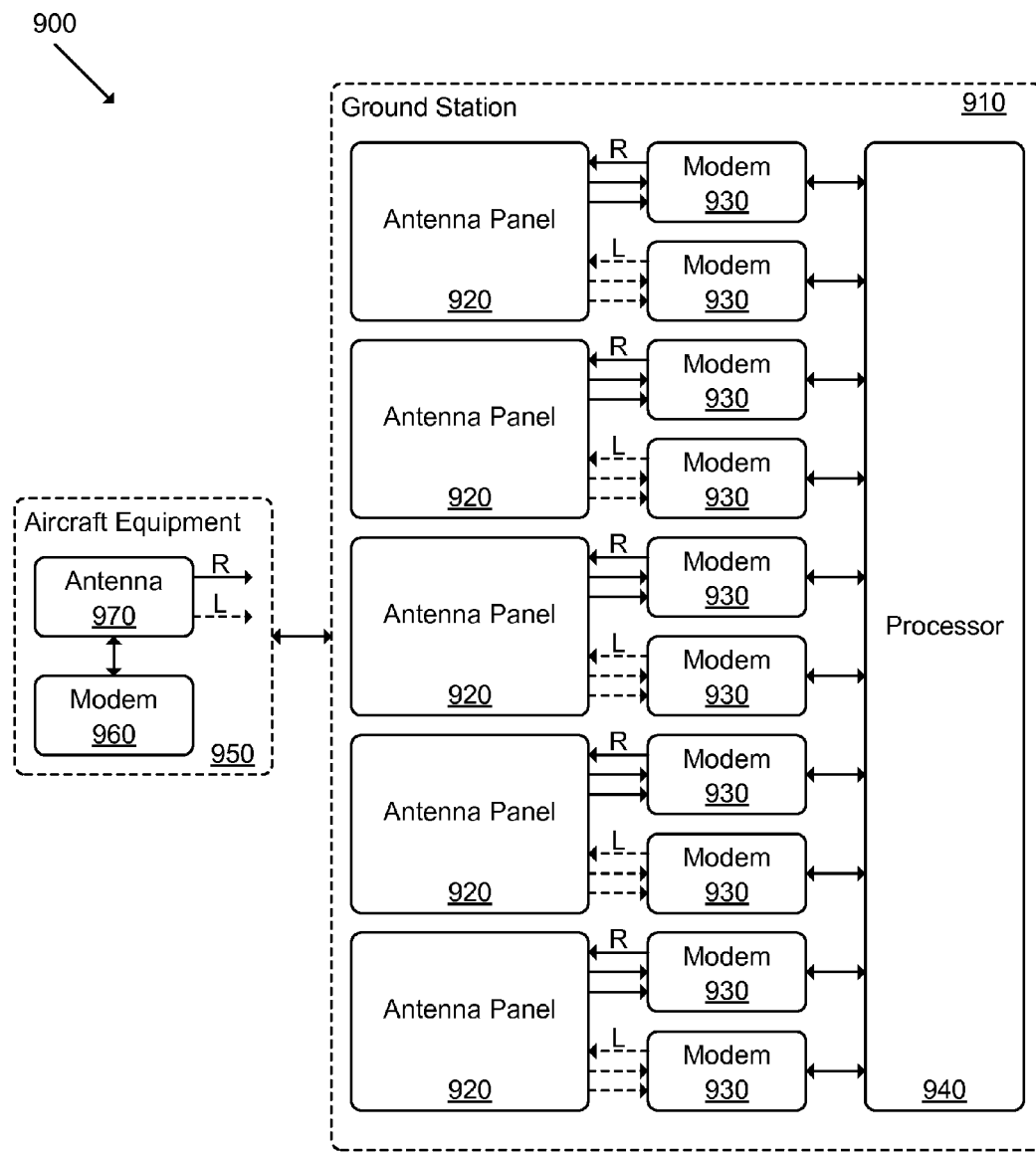
FIG. 9 illustrates a block diagram of a ground station antenna system.

This disclosure describes aspects of ground station and aircraft antenna systems 900 to provide broadband access to airborne platforms such as commercial and general aviation aircraft using a network of ground stations. As shown in FIG. 9, each ground station 910 is comprised of a number of antenna panels 920, a set of modems 930 attached to the antenna panels, and a processor 940 that controls the modems. Each antenna panel is comprised of two polarizations, referred to as left and right polarizations in FIG. 9. FIG. 9 shows five antenna panels. The ground station 910 corresponding to FIG. 9 creates ten fixed beams toward the aircraft 950. Each antenna panel in FIG. 9 creates two transmit beams. The alternating transmit beams have different polarizations. As shown in FIG. 9, two modems 930 are connected to each antenna panel 920. The arrow from each modem 930 to the antenna panel 920 is the signal from the modem 930 to be transmitted on one polarization beam toward the aircraft 950. The dashed arrows depict left antenna polarization, and the solid arrows depict right antenna polarization. Therefore, each modem 930 sends one signal toward the aircraft 950 on one polarization and the polarization of the beams of the two adjacent modems 930 are different.

On the receive side at the ground station 910, each antenna 920 panel generates two beams on the same polarization for each modem 930. The modem searches the two receive beams from the antenna panel 920 for signals and selects the beam that has the strongest signal.

The aircraft modem 960 is communicating with the ground station 910 on one of its antenna polarizations, referred to as the serving antenna polarization. Periodically, the aircraft modem will switch to the second polarization of the aircraft antenna 970 to search signals received on the alternate polarization to determine if handoff to the second polarization, or a different beam from the ground station 910, or to a different ground station is needed.

Figure 10:
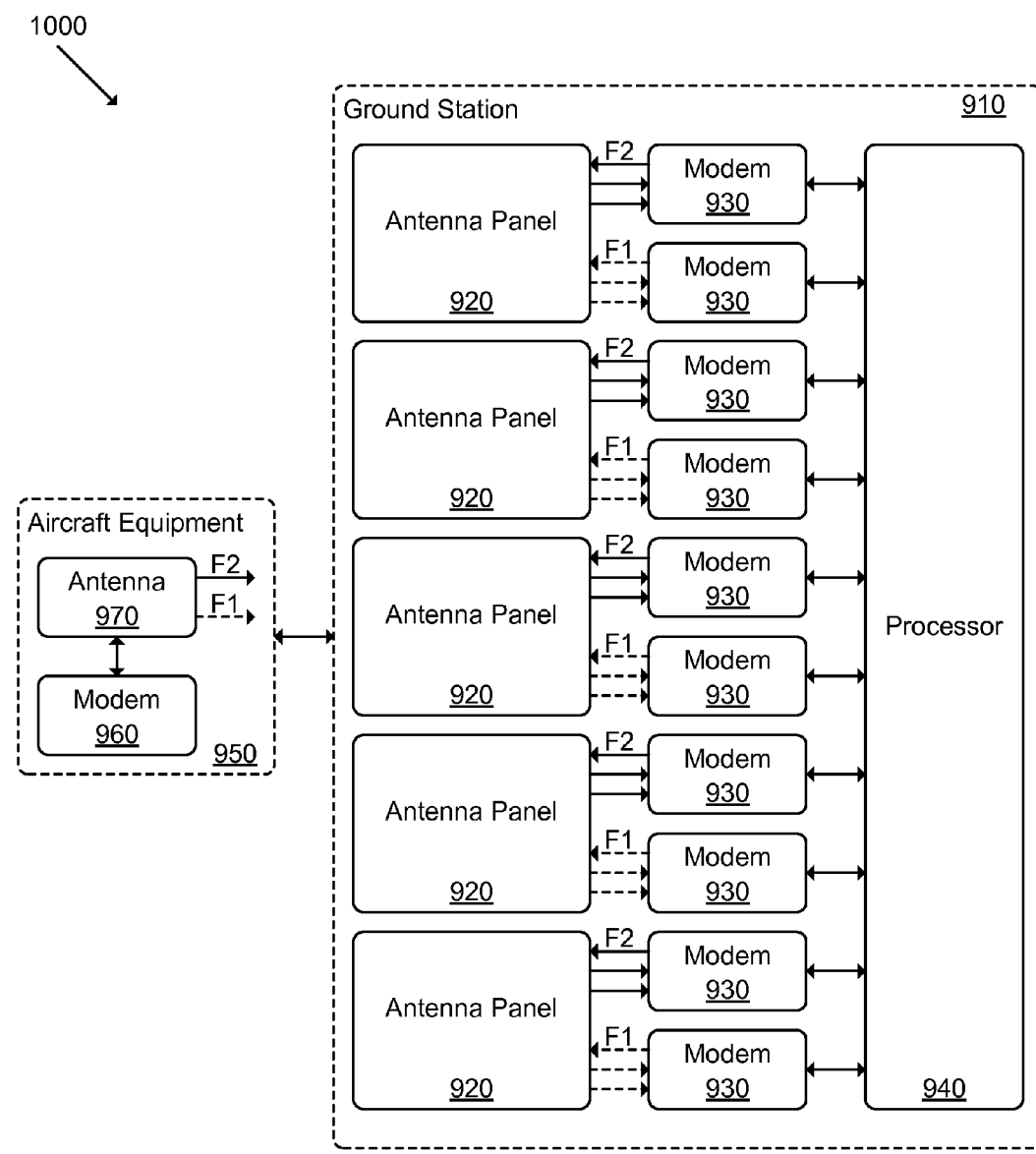
FIG. 10 illustrates a block diagram of an alternative station antenna system.

Note that FIG. 9 describes a ground station antenna system 900 where adjacent beams generated by the ground station antenna system are on different antenna polarizations. The reason for this is to reduce interference between adjacent beams. If there is only one antenna polarization available at the ground station 910 and the aircraft 950, then one would use frequency reuse between the two adjacent beams. In other words, the available frequency is divided into two sets of F1 and F2, and adjacent beams generated by the ground station antenna panels 920 would use different frequencies to avoid interference between the two adjacent beams. FIG. 10 shows the system 1000 that uses frequency reuse between adjacent beams. The system of FIG. 10 is the same as that of FIG. 9, but with antenna polarization reuse replaced by frequency reuse.

Figure 11:
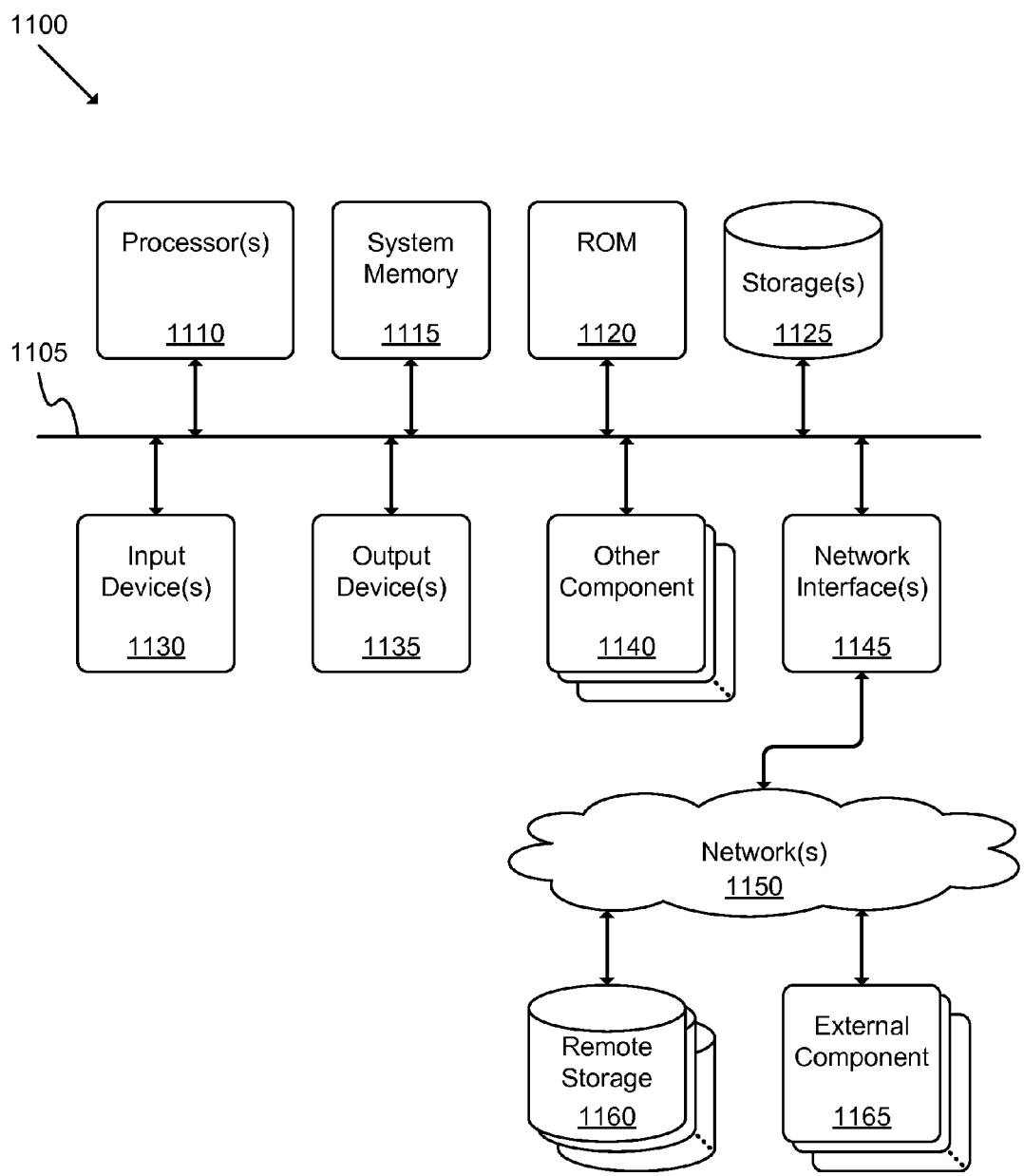
FIG. 11 conceptually illustrates a schematic block diagram of a computer system with which some embodiments of the invention may be implemented.

FIG. 11 conceptually illustrates a schematic block diagram of a computer system 1100 with which some embodiments of the invention may be implemented. For example, the system described above in reference to FIG. 1 may be at least partially implemented using computer system 1100. As another example, the processes described in reference to FIGS. 5-7 may be at least partially implemented using sets of instructions that are executed using computer system 1100.

Computer system 1100 may be implemented using various appropriate devices. For instance, the computer system may be implemented using one or more personal computers ("PC"), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 1100 may include at least one communication bus 1105, one or more processors 1110, a system memory 1115, a read-only memory (ROM) 1120, permanent storage devices 1125, input devices 1130, output devices 1135, various other components 1140 (e.g., a graphics processing unit), and one or more network interfaces 1145.

Bus 1105 represents all communication pathways among the elements of computer system 1100. Such pathways may include wired, wireless, optical, and/or other appropriate communication pathways. For example, input devices 1130 and/or output devices 1135 may be coupled to the system 1100 using a wireless connection protocol or system.

The processor 1110 may, in order to execute the processes of some embodiments, retrieve instructions to execute and/or data to process from components such as system memory 1115, ROM 1120, and permanent storage device 1125. Such instructions and data may be passed over bus 1105.

System memory 1115 may be a volatile read-and-write memory, such as a random access memory (RAM). The system memory may store some of the instructions and data that the processor uses at runtime. The sets of instructions and/or data used to implement some embodiments may be stored in the system memory 1115, the permanent storage device 1125, and/or the read-only memory 1120. ROM 1120 may store static data and instructions that may be used by processor 1110 and/or other elements of the computer system.

Permanent storage device 1125 may be a read-and-write memory device. The permanent storage device may be a non-volatile memory unit that stores instructions and data even when computer system 1100 is off or unpowered. Computer system 1100 may use a removable storage device and/or a remote storage device 1160 as the permanent storage device.

Input devices 1130 may enable a user to communicate information to the computer system and/or manipulate various operations of the system. The input devices may include keyboards, cursor control devices, audio input devices and/or video input devices. Output devices 1135 may include printers, displays, and/or audio devices. Some or all of the input and/or output devices may be wirelessly or optically connected to the computer system.

Other components 1140 may perform various other functions. These functions may include performing specific functions (e.g., graphics processing, sound processing, etc.), providing storage, interfacing with external systems or components, etc.

Finally, as shown in FIG. 11, computer system 1100 may be coupled to one or more networks 1150 through one or more network interfaces 1145. For example, computer system 1100 may be coupled to a web server on the Internet such that a web browser executing on computer system 1100 may interact with the web server as a user interacts with an interface that operates in the web browser. Computer system 1100 may be able to access one or more remote storages 1160 and one or more external components 1165 through the network interface 1145 and network 1150. The network interface(s) 1145 may include one or more application programming interfaces (APIs) that may allow the computer system 1100 to access remote systems and/or storages and also may allow remote systems and/or storages to access computer system 1100 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 1100 may be used in conjunction with the invention. Moreover, one of ordinary skill in the art will appreciate that many other system configurations may also be used in conjunction with the invention or components of the invention.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

It should be understood, of course, that the foregoing relates to illustrative details of exemplary embodiments of the invention and that modifications may be made without departing from the spirit and scope of the invention as defined by the following claims.

I claim:

1. A system for broadband access to airborne platforms, the system comprising:
a ground station comprising:
a plurality of antenna panels, each antenna panel having at least one polarization, each antenna panel placed at a lower corner of a local hexagonal shaped coverage area having a plurality of sectors, each antenna panel providing coverage to a particular sector from among the plurality of sectors while maintaining emissions toward a satellite in a geo-arc below a specified limit, wherein an antenna panel associated with a center sector from among the plurality of sectors has a largest size among the plurality of antenna panels and antenna panels associated with each of a plurality of edge sectors from among the plurality of sectors have a smallest size among the plurality of antenna panels:
a plurality of modems connected to the plurality of different antenna panels; and
a processor adapted to control the modems; and
an aircraft comprising:
a modem; and
at least one antenna connected to the modem,
wherein the ground station provides coverage to the aircraft flying in the local hexagonal shaped coverage area.

2. The system of claim 1, whereby each antenna panel is adapted to receive signals from multiple modems and send the signal from each modem on a separate beam toward the aircraft.

3. The system of claim 2, whereby beams generated by adjacent antenna panels toward the aircraft are on different polarizations.

4. The system of claim 2, whereby each modem accepts multiple receive beams from at least one antenna panel.

5. The system of claim 4, whereby each ground station modem chooses the receive beams with the strongest signal.

6. The system of claim 4, whereby each ground station modem combines the multiple receive beams.

7. The system of claim 4, whereby the receive beams for adjacent ground station modems are on different polarizations.

8. The system of claim 2, whereby adjacent beams toward the aircraft are transmitted using different frequencies.

9. The system of claim 2, whereby the receive beams for adjacent modems are on different frequencies.

10. A communication system adapted to provide broadband access to aircraft, the system comprising:
a plurality of ground stations, each ground station comprising:
an array of antenna panels, each antenna panel placed at a lower corner of a local hexagonal shaped coverage area having a plurality of sectors, each antenna panel providing coverage to a particular sector from among the plurality of sectors while maintaining emissions toward a satellite in a geo-arc below a specified limit, wherein an antenna panel associated with a center sector from among the plurality of sectors has a largest size among the plurality of antenna panels and antenna panels associated with each of a plurality of edge sectors from among the plurality of sectors have a smallest size among the plurality of antenna panels;
a first and second modem communicatively coupled to each antenna panel in the set of antenna panels; and
a processor communicatively coupled to each modem; and
at least one aircraft comprising:
an antenna that is able to form a communication channel with at least one antenna panel from the set of antenna panels; and
a modem communicatively coupled to the antenna,
wherein the ground station provides coverage to the aircraft flying in the local hexagonal shaped coverage area.

11. The communication system of claim 10, wherein the first modem is associated with a first polarization and the second modem is associated with a second polarization.

12. The communication system of claim 11, wherein the array of antenna panels is arranged such that each antenna panel that is associated with the first polarization is adjacent to at least one antenna panel that is associated with the second polarization.

13. The communication system of claim 10, wherein the first modem is associated with a first frequency and the second modem is associated with a second frequency.

14. The communication system of claim 13, wherein the array of antenna panels is arranged such that each antenna panel that is associated with the first frequency is adjacent to at least one antenna panel that is associated with the second frequency.

15. The communication system of claim 10, wherein the aircraft antenna is adapted to communicate using two polarizations.

16. The communication system of claim 10, wherein the aircraft antenna is adapted to communicate using at least two frequencies.

* * * * *